United States Patent [19]
Ramamurthy

[11] Patent Number: 5,773,774
[45] Date of Patent: Jun. 30, 1998

[54] ELECTRICAL SWITCH WITH OMEGA SHAPED RETURN SPRING

[75] Inventor: Rajkumar Ramamurthy, Keokuk, Iowa

[73] Assignee: Methode Electronics, Inc., Chicago, Ill.

[21] Appl. No.: 643,017

[22] Filed: May 2, 1996

[51] Int. Cl.[6] .............................. H01H 21/44; F16F 1/18; H01C 10/36
[52] U.S. Cl. ....................... 200/11 K; 267/159; 338/162
[58] Field of Search ............................... 200/11 R–11 W, 200/560–572, 275, 402–472; 267/150–159, 166–182; 338/153–172

[56] References Cited

U.S. PATENT DOCUMENTS

| | | | |
|---|---|---|---|
| 3,497,644 | 2/1970 | Schink et al. ......................... | 200/11 C |
| 3,892,931 | 7/1975 | Lockard ................................ | 200/11 R |
| 4,032,128 | 6/1977 | Nicolaisen et al. .................... | 267/159 |
| 4,039,791 | 8/1977 | Nicolaisen et al. .................... | 200/451 |
| 4,114,002 | 9/1978 | Hochgesang ...................... | 200/11 K X |
| 4,423,296 | 12/1983 | McSparran .......................... | 200/453 X |
| 4,746,771 | 5/1988 | Koslar ................................... | 200/16 D |
| 4,801,914 | 1/1989 | Kerai ..................................... | 338/162 |
| 4,920,773 | 5/1990 | Surko, Jr. ............................... | 70/224 |
| 5,010,214 | 4/1991 | Yamazaki ............................... | 200/6 B |

*Primary Examiner*—J. R. Scott
*Attorney, Agent, or Firm*—David L. Newman; Jeffrey H. Canfield

[57] ABSTRACT

The present invention provides an electrical switch with a return spring comprising a housing having a cylindrical shaped rotor having a brace member extending therefrom and in a centered position, the brace member is positioned adjacent to a stop abutment member protruding within the aperture of the switch housing and a spring member mounted on the rotor having arms which abut against the edges of the brace member and the stop abutment in the centered position and upon rotation of the rotor, the arms of the spring will cause the rotor to return to its centered position. The brace member abuts the arms of the return spring and upon rotation of the rotor, the braces cause the arms of the return spring to deform. The return spring in a preferred embodiment has an Omega shape.

18 Claims, 3 Drawing Sheets

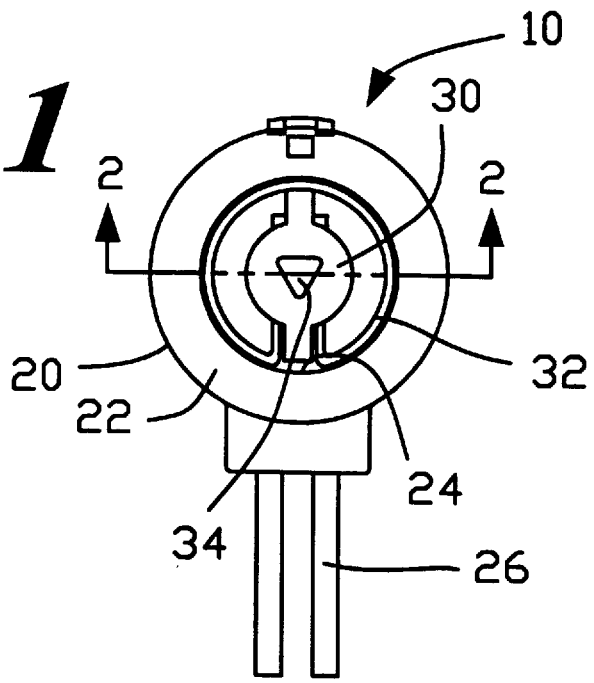

ELECTRICAL SWITCH WITH OMEGA SHAPED RETURN SPRING

BACKGROUND OF THE INVENTION

The present invention relates electrical switches and, in particular, electrical switches having a return spring.

Electrical switches with return springs are known having coil torsion springs. The coil torsion springs generally have multiple layers of wire spring coiled in a circular configuration. The beginning section of the coil includes a tab member protruding from the coil. The end portion of the coil also includes a tab member protruding from the coil. The tabs provide attaching portions so that the spring may operate to provide a spring mechanism within a switch. Such coil spring constructions require that the spring have a great height so that sufficient coils may be wound in order to provide the appropriate spring force. Also, because of the construction of the coil spring having the beginning portion and the terminal portion protruding from the spring, the assembly of the spring is made difficult and also the placement of the coil spring within an electrical switch can be difficult. It is also difficult to center the coil spring within the electrical switch housing. Therefore, there is desired an electrical switch with a return spring which overcomes the aforementioned difficulties.

It is therefore an object of the present invention to provide an electrical switch having a return spring which is formed in a manner which is easy to construct and also easily inserted within the housing of the electrical switch.

It is another object of the present invention to provide a return spring having a low profile in order to reduce the overall package height.

It is a further object of the present invention to provide an electrical switch having a return spring which is easily centered when mounted within the electrical switch housing.

SUMMARY OF THE INVENTION

A principal object of this invention is to provide an electrical switch comprising a housing have an aperture, a rotor mounted within the aperture, having a centered position, a stop abutment attached to the housing protruding into the aperture and a spring member formed of a flat unitary resilient material mounted on the rotor having a first arm and a second arm for abutting against the stop abutment of the housing in order to provide a spring force to return the rotor back to the centered position. The spring may include a center portion having a gap defined by a first and second point on the center portion wherein the first arm protrudes perpendicularly from the first point and the second arm protrudes perpendicularly from the second point. The center portion may have a semi-circular shape. The rotor may include a base having a contact attached thereto and the housing includes a printed circuit board adjacent the base in order to provide for the abutment of the contact against a trace of the printed circuit board wherein a change in resistance is measured upon rotation of the rotor and the contact. The rotor may include a cavity for receiving the projecting portion of an assembly to be mounted to the electrical switch. The housing may include a bore in its base for receiving a shaft projecting from a bottom point of the rotor upon which the rotor rotates within the aperture of the housing. The rotor may include a base having an edge which abuts the stop abutment of the housing in order to limit the rotation of the rotor. The spring may provide for a spring force of about 60 milli N-M. The rotor may include a brace member protruding from the rotor wherein the rotor is in a centered position when the brace is adjacent the stop abutment. The first arm may have a length which is equal to the length of a first surface of the brace and a first side of the stop abutment measured between the rotor body and the aperture wall of the housing. The electrical switch upon rotation of the rotor may have the first arm of the spring abutting a first side of the stop abutment while the brace of the rotor slides past the stop abutment out of a centered position and the second arm of the spring abuts a second surface of the brace causing the semi-circular portion of the spring to deform and creating a spring force to return the rotor to a centered position. The brace may include a convex surface which is adjacent a corresponding concave surface of the stop abutment when the rotor is in the centered position.

In an embodiment, a return spring for providing a spring force in an electrical switch is provided which comprises a flat resilient metallic member having a center portion having a gap defined by a first and second point on the center portion, a first arm protruding perpendicularly from the first point and a second arm protruding perpendicularly from the second point. The electrical switch may include a housing having a rotor mounted therein having an external shape corresponding to the shape of the return spring and having a brace member adjacent a stop abutment of the housing of the electrical switch at a centered position wherein the first and second leg of the spring member mounted on the rotor will provide spring force in order to return the rotor member back to the centered position. The electrical switch may include a housing having an aperture having a rotor mounted therein and the return spring mounted on the rotor wherein at a centered position of the rotor, the first arm abuts a first side of the stop abutment protruding into the aperture and the second arm abuts a second side of the stop abutment. The spring force may be created in the return spring by enlarging the gap of the center portion of the return spring caused by the rotation of the rotor causing the first arm to be rotated away from the first side. The center portion may have a semi-circular shape.

In an embodiment, an electrical switch comprises a housing having an aperture, a rotor mounted within the aperture, including a brace member, a stop abutment attached to the housing where in a centered position of the rotor the brace is adjacent to the stop abutment and a spring member having a center portion having a gap defined by a first and second point on the center portion wherein a first arm protrudes perpendicularly from the first point and a second arm protrudes perpendicularly from the second point and the first arm and the second arm for abutting against the brace of the rotor and the stop abutment of the housing in order to provide a spring force to return the rotor back to the centered position. The spring member may be formed of a flat unitary resilient material. The electrical switch in the centered position, the first arm may abut against a first surface of the brace and a first side of the stop abutment and the second arm may abut against a second surface of the brace and a second side of the stop abutment.

These and other features of the invention are set forth below in the following detailed description of the presently preferred embodiments.

BRIEF DESCRIPTION OF THE DRAWINGS

FIG. 1 is a plan view of an electrical switch of the present invention;

FIG. 2 is a side elevation cut-away view of FIG. 1 taken at line 2—2;

DETAILED DESCRIPTION OF THE PRESENTLY PREFERRED EMBODIMENTS

Figure 3:
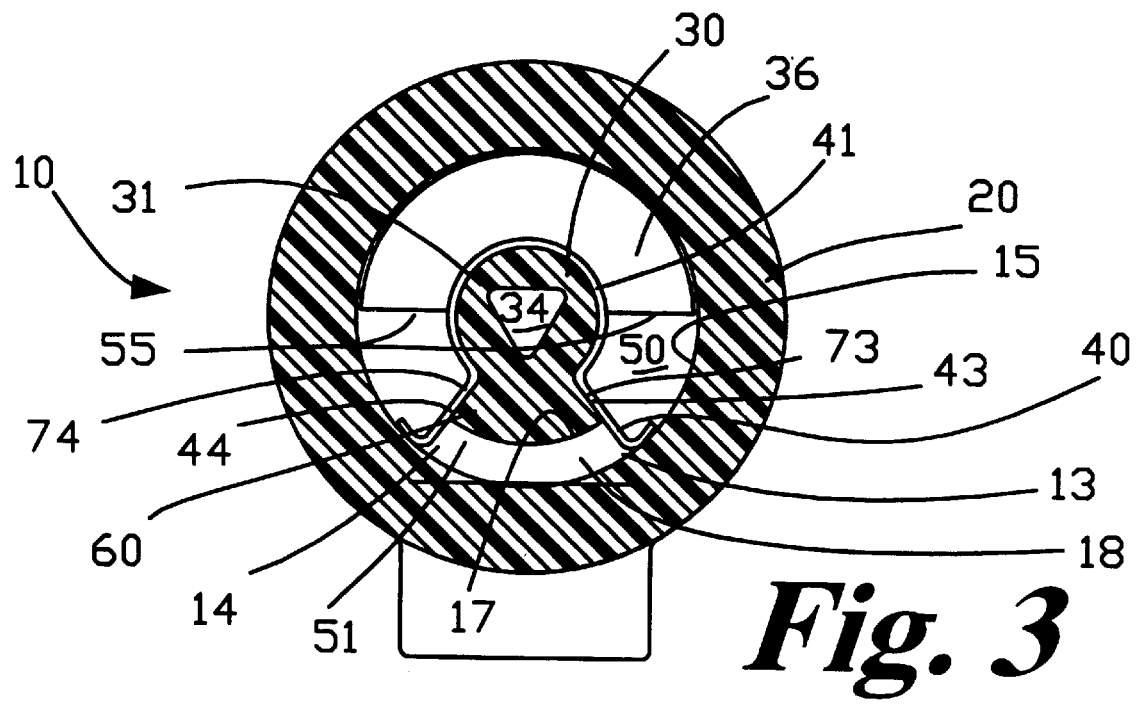
FIG. 3 is a top cut-away plan view of FIG. 2 taken at line 3—3.

The present invention is best understood with reference to FIGS. 1–6. FIG. 1 is a plan view of an electrical switch of the present invention. In a preferred embodiment, the electrical switch 10 is a disarm switch which may be used in the door of an automobile to receive the protruding end portion of a lock cylinder in order to arm and disarm an automobile security system. The switch 10 includes a housing 20 including a cover 22 having an opening 24 exposing a rotor 30. The rotor 30 is surrounded by a clip 32. The rotor 30 has at its center portion a cavity 34 for receiving the protruding end portion of a lock cylinder in a preferred embodiment. Electrical cables 26 are attached to the printed circuit board 50 (FIG. 2). The electrical cables 26 carry electrical signals from resistors in the printed circuit board 55 and connect to the security system in a preferred embodiment.

Turning to FIG. 2, a side elevation cut-away view of FIG. 1 taken at line 2—2 is shown. The housing 20 includes cover 22 having opening 24. The cover 22 is attached to the housing 20 via energy directors 21 that are fused via ultrasonic welding to form a strong bond. In a preferred embodiment, the cover 22 may be attached to the housing 20 via ultrasonic welding. Mounted within an aperture 15 of the housing is rotor 30. The rotor 30 includes a cylindrical shaped body 31 surrounding cavity 34 and having a base portion 36. Protruding from the bottom of the rotor 30 is a shaft 38 which is received by a bore 29 in the base of the housing 20. The rotor 30 is compressed downward into the housing 20 via an O-ring 23 which is compressed between the cover 22 and the top surface 35 of the rotor. The O-ring 23 sits in a groove 37 which is greased so that the O-ring may easily slide against the surface of the groove 37 of the rotor 30 when it is rotated. Surrounding the body 31 of the rotor 30 is a return spring 40. The return spring 40 maintains the rotor in a centered position and provides for a spring force against the rotor 30 when it is rotated. A snap ring 33 is mounted on the body 31 of the rotor 30 and provides for the function of attaching the rotor 30 of the switch 10 to the protruding end portion of a lock cylinder.

In a preferred embodiment, the electrical switch 10 operates according to the following method. A protruding member of a lock cylinder (not shown) is inserted through the opening 24 of the housing 20 and into the cavity 34 of the rotor 30. In a preferred embodiment, the cavity 34 has a triangular shape that corresponds to a triangular shaped protruding member of a lock cylinder. The lock cylinder and the electrical switch 10 is operated when the protruding member rotates and correspondingly causes the rotor 30 to rotate. In a preferred embodiment, this generally will occur when the operator of an automobile inserts the key into the door lock and turns the key either clockwise or counterclockwise. The force of the key turning in the lock cylinder is transferred to the rotor 30 which in turn rotates corresponding to the rotation of the key. Upon rotation, the metal contact 39 attached to the base 36 of the rotor 30 will slide against a trace of a printed circuit board 50 located in the base of the housing 20. In a preferred embodiment, the printed circuit board is insert molded in the housing. The printed circuit board 50 includes conductive traces having a circular path corresponding to the path of the metal contacts 39. Also mounted on the printed circuit board 50 are resistors attached to the conductive traces. Upon rotation of the rotor 30, the resistance values measured by the resistors on the printed circuit board 50 will change. Such change in resistance values are then sent as electrical signals through electrical cables 26 to the security alarm of the automobile in order to arm or disarm the security system in a preferred embodiment. In an alternate embodiment, a resistor may be located external to the switch 10. The base 36 also is semi-circular shaped having an edge 55.

FIG. 3 is a top plan cut-away view of FIG. 2 taken at line 3—3. The electrical switch 10 housing 20 includes the aperture 15 having the rotor 30 mounted therein. The rotor 30 includes a central body portion 31 that surrounds the cavity 34. In a preferred embodiment, the cavity 34 is triangular shaped for receiving a triangular shaped projecting member of a lock cylinder. The body 31 is generally cylindrical in shape except for a brace member 60 which protrudes from the body 31 of the rotor 30. The brace 60 includes a leading edge 61 which has a convex shape to correspond to a concave-shaped inner diameter edge 17 of a stop abutment member 18 which protrudes from the housing 20 into the aperture 15. The rotor 30 also includes a base portion 36 which protrudes from the bottom 58 of the rotor 30 and has a diameter just slightly less than the diameter of the aperture 15. The base 36 has approximately a semi-circular shape and includes the edge 55 which will abut against the stop abutment 18 upon rotation of the rotor 30. Mounted in the base of the housing 20 is printed circuit board 50 which has traces mounted thereon, underneath the base 36 of the rotor 30.

The spring 40 has a semi-circular shaped center portion 41 which has a diameter just slightly larger than the exterior diameter of the body portion 31 of the rotor 30. The spring is mounted on the rotor 30 by slipping the semi-circular portion 41 over the body portion 31 of the rotor 30. The spring includes a first arm 43 and a second arm 44 which protrude from the semi-circular portion 41 to form a gap 47 (see FIG. 6) in the semi-circular portion. The first arm 43 abuts a first surface 73 of the brace 60 and a first side 13 of the stop abutment and the second arm 44 abuts a second surface 74 of the brace 60 and a second side 14 of the stop abutment 18. The arms 43,44 extend to the wall of the aperture 15. Therefore, it may be understood that the arms 43,44 of the spring 40 provide for a spring force in order to keep the rotor 30 in its centered position as shown in FIG. 3.

Figure 4:
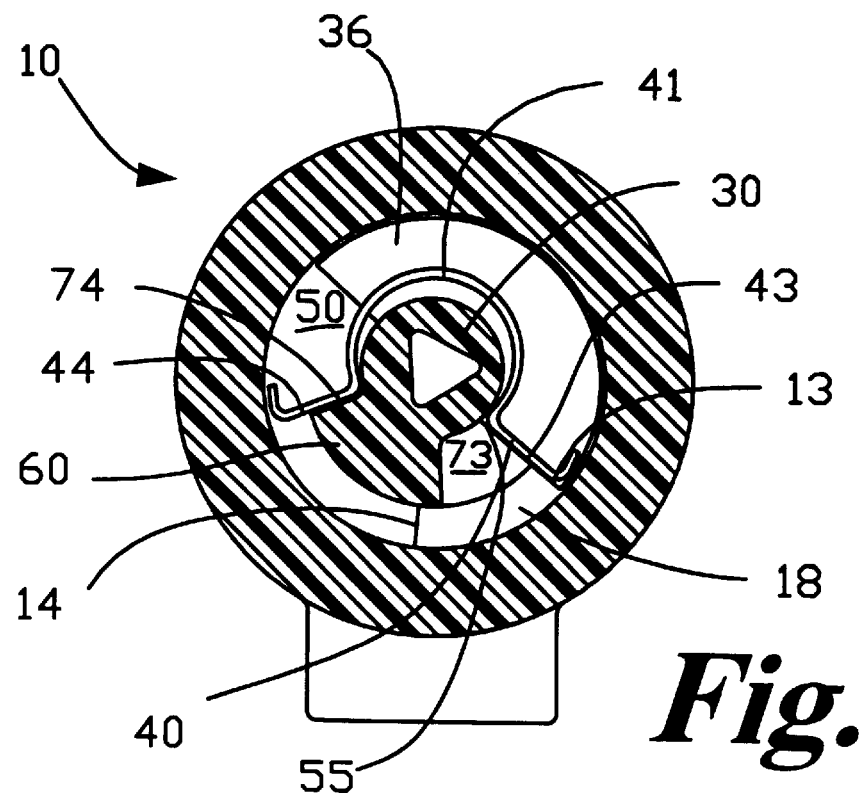
FIG. 4 is a top cut-away plan view of the switch of the present invention showing the switch rotated to its furthest clockwise position.

Turning to FIG. 4, the functioning of the switch 10 may be more clearly understood. The rotor 30 in FIG. 4 is shown rotated clockwise to its furthest position. Upon rotation, the first arm 43 of the spring remains in abutment against the first side 13 of the stop abutment 18 and the second arm 44 is forced by the second surface 74 of the brace 60 to move in the clockwise direction away from its centered position against the second side 14 of the stop abutment 18. The rotation of the rotor 30 and the brace 60 causes the spring 40 to deform at the semi-circular portion 41. The stop abutment 18 runs axially through the aperture 15 of the housing 20 so that it is adjacent both the brace 60 at the top 35 of the rotor 30 and the base 36 at the bottom 58 of the rotor 30. Upon rotation of the rotor 30, the base 36 also rotates causing the edge 55 to abut against the first side 13 of the stop abutment 18 below the first arm 43 of the spring 40. The base 36 is attached to the body 31 of the rotor 30 and the abutment of the edge 55 of the base 36 against the stop abutment 18 prohibits the rotor 30 from rotating any further. This maximum rotation point will correspond to the preferred angle of rotation required by the component to which the electrical switch 10 is attached. For example, in the preferred embodiment, the key which is inserted in a lock assembly is only desired to rotate approximately 46° clockwise and 46° counterclockwise. However, the base 36 may be formed in any orientation having the edge 55 extending either more or less around the rotor 30 in order to provide the preferred amount of rotation. It may be understood that upon rotation of the rotor 30 and the simultaneous movement of the base 36, the contact 39 mounted on the underside of the base and coming in contact with the printed circuit board 50 causes a change in the resistance level of the resistors mounted on the printed circuit board 50 in order to affect the signalling of a security system in a preferred embodiment.

Figure 5:
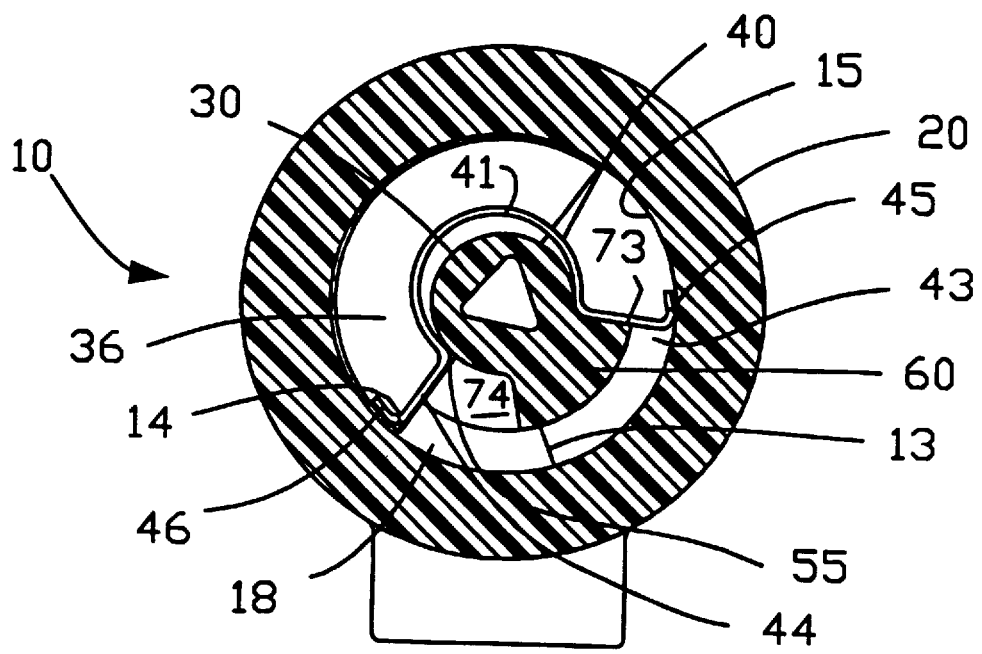
FIG. 5 is a top cut-away plan view of the switch of the present invention showing the switch rotated to its furthest counterclockwise position.

Turning to FIG. 5, the rotor 30 is shown rotated in the counterclockwise direction from FIG. 4 having the edge 55 abutting the second side 14 stop abutment 18 and the second arm 44 of the spring 40 simultaneously abutting the second side 14 of the stop abutment 18. The first arm 43 remains braced against the first surface 73 of the brace 60 of the body 31 of the rotor 30 and causes the spring 40 to deform at the semi-circular portion 41. The spring 40 also includes feet 45,46 which protrude approximately perpendicular to the legs 43,44, respectively and allow for the smooth movement of the spring 40 against the wall of the aperture 15 of the housing 20. It can be understood that when the force against the rotor causing it to turn in the clockwise or counterclockwise direction is released, the spring 40 will cause the rotor 30 to return to its centered position shown in FIG. 3. The force of the arms 43,44 against the brace 60 will cause the rotor 30 attached thereto to return to its position so that the brace 60 is adjacent the stop abutment 18 and both the first and second legs 43,44 of the spring 40 will also be in the centered position against the sides 13,14 of the stop abutment 18. In accordance with the present invention, it may be understood that the spring 40 may be easily inserted within the housing 20 and easily located in its centered position. In fact, the shape of the spring 40 which is formed correspondingly to the shape of the rotor body 31 and brace 60 ensures that when the spring 40 is mounted within the electrical switch 10, it will be in its proper position.

Figure 6:
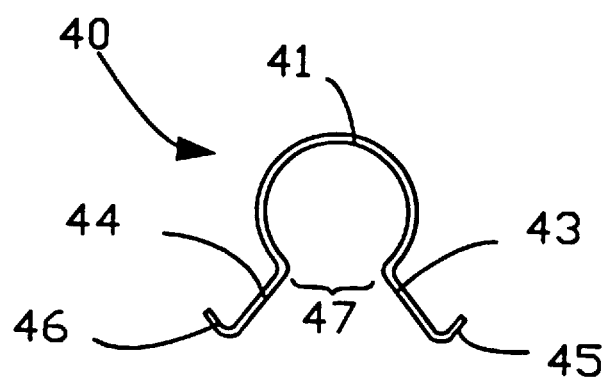
FIG. 6 is a plan view of the return spring of the present invention.

FIG. 6 shows a plan view of the spring 40 of the present invention having the semi-circular portion 41, first arm 43, foot 45, second arm 44 and foot 46. In a preferred embodiment, the entire spring 40 is formed from a one-piece metallic member which is stamped from sheet having a thickness of 0.30 mm. In a preferred embodiment, the spring 40 has a height of 1.5 mm to 2 mm. The spring may provide a spring force of approximately 60 milli N-M. The inner diameter of the spring is approximately 7.0 mm. The spring 40 forms semi-circular portion 41 except for the gap 47. Protruding from the semi-circular portion at the gap 47 are first and second arms 43,44. The arms protrude approximately perpendicular to points on the semi-circular portion where the gap 47 begins. The foot 45 of the first arm 43 protrudes approximately perpendicular to the first arm 43 and the foot 46 of the second arm 44 protrudes approximately perpendicular to the second arm 44.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An electrical switch comprising:
   a housing having an aperture and a base, the base including a plurality of electrical circuit elements associated therewith;
   a rotor mounted within the aperture having a brace member protruding from the rotor wherein the rotor is in a centered position when the brace is adjacent a stop abutment;
   a first and a second contact protruding from the rotor and interacting with the plurality of circuit elements, thereby forming alternate circuit paths among the plurality of circuit elements as the rotor is rotated relative to the base;
   a stop abutment attached to the housing protruding into the aperture; and
   an Omega-shaped spring member formed of a flat unitary resilient material mounted on the rotor having a first arm and second arm for abutting against the stop abutment of the housing and the brace member in order to provide a spring force to return the rotor back to the centered position.

2. The electrical switch of claim 1 wherein the spring includes a center portion having a gap defined by a first and second point on the center portion wherein the first arm protrudes perpendicularly from the first point and the second arm protrudes perpendicularly from the second point.

3. The electrical switch of claim 2 wherein the center portion has a semi-circular shape.

4. The electrical switch of claim 1 wherein the housing includes a printed circuit board adjacent the base, the plurality of circuit elements being formed on a surface of the printed circuit board, at least one of the circuit elements comprising an arcuate resistive trace wherein upon rotation of the rotor one of said first and second contacts moves along the resistive trace, thereby effecting a change of resistance in a circuit path created by the first and second contact.

5. The electrical switch of claim 1 wherein the rotor includes a cavity for receiving the projecting portion of an assembly to be mounted to the electrical switch.

6. The electrical switch of claim 1 wherein the housing includes a bore in its base for receiving a shaft projecting from a bottom point of the rotor upon which the rotor rotates within the aperture of the housing.

7. The electrical switch of claim 1 wherein the rotor includes a base having an edge which abuts the stop abutment of the housing in order to limit the rotation of the rotor.

8. The electrical switch of claim 1 including a spring which provides for a spring force of about 60 milli N-M.

9. The electrical switch of claim 1 wherein the first arm has a length which is equal to the length of a first surface of the brace and a first side of the stop abutment measured between the rotor body and the aperture wall of the housing.

10. The electrical switch of claim 1 wherein upon rotation of the rotor, the first arm of the spring abuts a first side of the stop abutment and the brace of the rotor slides past the stop abutment out of the centered position and the second arm of the spring abuts a second surface of the brace causing the semi-circular portion of the spring to deform and creating a spring force to return the rotor to a centered position.

11. The electrical switch of claim 1 wherein the brace includes a convex surface which is adjacent a corresponding concave surface of the stop abutment when the rotor is in the centered position.

12. A return spring for providing a spring force in an electrical switch wherein the return spring comprises:
   a flat resilient metallic member having a thickness of less than 0.5 mm, having an Omega shape, having a center portion having a gap defined by a first and second point on the center portion;
   a first arm protruding perpendicularly from the first point;
   a second arm protruding perpendicularly from the second point; and the return spring mounted in a housing having a rotor mounted therein having an external shape corresponding to the shape of the return spring and having a brace member adjacent a stop abutment of the housing of the electrical switch at a centered position wherein the first and second leg of the spring member mounted on the rotor will provide the spring force in order to return the rotor member back to the centered position.

13. The return spring of claim 12 wherein the electrical switch includes a housing having an aperture having a rotor mounted therein and the return spring mounted on the rotor wherein at a centered position of the rotor the first arm abuts a first side of a stop abutment protruding into the aperture and the second arm abuts a second side of the stop abutment.

14. The return spring of claim 13 wherein a spring force is created in the return spring by enlarging the gap of the center portion of the return spring caused by the rotation of the rotor causing the first arm to be rotated away from the first side.

15. The return spring of claim 12 wherein the center portion has a semi-circular shape.

16. An electrical switch comprising:
   a housing having an aperture and a base having a first contact;
   a rotor mounted within the aperture, including a brace member integrally formed with the rotor and a second contact protruding therefrom for providing an electrical connection with the first contact;
   a stop abutment attached to the housing wherein in a centered position of the rotor, the brace is adjacent the stop abutment; and
   an Omega-shaped spring member formed of a flat unitary resilient material having a center portion having a gap defined by a first and second point on the center portion wherein a first arm protrudes perpendicularly from the first point and a second arm protrudes perpendicularly from the second point and the first arm and the second arm for abutting against the brace of the rotor and the stop abutment of the housing in order to provide a spring force to return the rotor back to the centered position.

17. The electrical switch of claim 16 wherein the spring member is formed of a flat unitary resilient material.

18. The electrical switch of claim 16 wherein in the centered position, the first arm abuts against a first surface of the brace and a first side of the stop abutment and the second arm abuts against a second surface of the brace and a second side of the stop abutment.

* * * * *